United States Patent
Kane et al.

(10) Patent No.: US 9,327,769 B2
(45) Date of Patent: May 3, 2016

(54) VEHICLES HAVING INTERNAL BODY CAVITY SEALS AND METHODS OF ASSEMBLING THE SAME

(71) Applicant: Toyota Motor Engineering & Manufacturing North America, Inc., Erlanger, KY (US)

(72) Inventors: James R. Kane, Ypsilanti, MI (US); Sagar V. Kulkarni, Troy, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 14/477,920

(22) Filed: Sep. 5, 2014

(65) Prior Publication Data

US 2016/0068197 A1 Mar. 10, 2016

(51) Int. Cl.
*B62D 27/00* (2006.01)
*B62D 24/02* (2006.01)
*B62D 65/02* (2006.01)

(52) U.S. Cl.
CPC ............. *B62D 24/02* (2013.01); *B62D 65/024* (2013.01)

(58) Field of Classification Search
CPC .............. B60R 13/0815; B60R 13/083; B60R 13/0838; B60R 13/0861; B62D 27/04
USPC .......... 296/181.6, 1.03, 39.3, 187.02
See application file for complete search history.

(56) References Cited

U.S. PATENT DOCUMENTS

| | | | |
|---|---|---|---|
| 5,016,936 A | * | 5/1991 | Goodrich .................. B32B 5/02 296/39.3 |
| 5,741,824 A | | 4/1998 | Butschbacher et al. |
| 6,926,784 B2 | | 8/2005 | Bock |
| 7,247,657 B2 | | 7/2007 | Duffin et al. |
| 7,478,863 B2 | | 1/2009 | Krause |
| 7,838,100 B2 | | 11/2010 | McLeod et al. |
| 8,469,143 B2 | | 6/2013 | Prunarety et al. |
| 8,726,590 B2 | | 5/2014 | Miura et al. |
| 2011/0024993 A1 | | 2/2011 | Happel et al. |
| 2013/0082413 A1 | | 4/2013 | Ui et al. |
| 2013/0280451 A1 | | 10/2013 | Kobayashi et al. |
| 2014/0175825 A1 | * | 6/2014 | Shimanaka ............ B62D 25/16 296/39.3 |

FOREIGN PATENT DOCUMENTS

DE 3627725 * 2/1988
DE 3716616 * 1/1989

* cited by examiner

*Primary Examiner* — Dennis H Pedder
(74) *Attorney, Agent, or Firm* — Dinsmore & Shohl LLP

(57) ABSTRACT

Vehicles having internal body cavity seals and methods of assembling the same are disclosed herein. In one embodiment, a vehicle includes a vehicle structural member, an exterior vehicle body panel that is coupled to the vehicle structural member and is spaced apart from the vehicle structural member at an internal body cavity, and a compressible sealing member that is positioned in the internal body cavity such that the compressible sealing member is concealed from an exterior of the vehicle. The compressible sealing member is coupled to at least one of the vehicle structural member or the exterior vehicle body panel and is compressed from an uninstalled thickness such that the compressible sealing member contacts both the vehicle structural member and the exterior vehicle body panel.

10 Claims, 4 Drawing Sheets

VEHICLES HAVING INTERNAL BODY CAVITY SEALS AND METHODS OF ASSEMBLING THE SAME

TECHNICAL FIELD

The present specification generally relates to vehicles that include internal body cavity seals and, in particular, vehicles having compressible members that are positioned within internal body cavities.

BACKGROUND

Vehicles may include a variety of body structures that include a plurality of sheet metal components that are coupled to one another to form the structural components of the vehicle, along with the body of the vehicle. In some vehicle configurations, the adjacent sheet metal components may form internal body cavities that are hollow at positions in which the adjacent sheet metal components are spaced apart from one another.

In some embodiments, noise, for example, engine noise, road noise, and/or wind noise, may be conveyed through the internal body cavities. The conveyance of noise along the internal body cavities may adversely affect passenger comfort by introducing additional noise into the passenger cabin of the vehicle, which may adversely affect the vehicle occupants' sense of noise, vibration, and harshness of the vehicle.

Accordingly, vehicles having internal body cavity seals may be desired.

SUMMARY

In one embodiment, a vehicle includes a vehicle structural member, an exterior vehicle body panel that is coupled to the vehicle structural member and is spaced apart from the vehicle structural member at an internal body cavity, and a compressible sealing member that is positioned in the internal body cavity such that the compressible sealing member is concealed from an exterior of the vehicle. The compressible sealing member is coupled to at least one of the vehicle structural member or the exterior vehicle body panel and is compressed from an uninstalled thickness such that the compressible sealing member contacts both the vehicle structural member and the exterior vehicle body panel.

In another embodiment, a method of assembling body panels of a vehicle includes coupling a compressible sealing member to one of a vehicle structural member or an exterior vehicle body panel, in which the compressible sealing member has an uninstalled thickness. The method also includes coupling the exterior vehicle body panel to the vehicle structural member such that the vehicle structural member and the exterior vehicle body panel form an internal body cavity between one another. The compressible sealing member is compressed from the uninstalled thickness to contact both the vehicle structural member and the exterior vehicle body panel.

In yet another embodiment, a vehicle includes a vehicle structural member and an exterior vehicle body panel that is coupled to the vehicle structural member and spaced apart from the vehicle structural member at an internal body cavity. The vehicle also includes a compressible sealing member that is positioned in the internal body cavity and is coupled to one of the vehicle structural member or the exterior vehicle body panel. The compressible sealing member is compressed from an uninstalled thickness to contact both the vehicle structural member and the exterior vehicle body panel to reduce the transmission of noise along the internal body cavity. At least one of the vehicle structural member or the exterior vehicle body panel include a region having a corrosion resistant coating and a region free of the corrosion resistant coating. The compressible sealing member covers the region of the at least one of the vehicle structural member or the exterior vehicle body panel that is free of the corrosion resistant coating.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Vehicles having internal body cavity seals and methods of assembling vehicles having the same are disclosed herein. A vehicle may include a vehicle structural member and an exterior vehicle body panel that is coupled to the vehicle structural member and spaced apart from the vehicle structural member at an internal body cavity. The vehicle may also include a compressible sealing member that is positioned in the internal body cavity such that the compressible sealing member is concealed from an exterior of the vehicle. The compressible sealing member may be coupled to at least one of vehicle structural member or the exterior vehicle body panel. When installed in the internal body cavity, the compressible sealing member is compressed from an uncompressed thickness to contact both the vehicle structural member and the exterior vehicle body panel. The compressible sealing member may reduce the transmission of noise along the internal body cavity, such that the introduction of noise to the passenger cabin is reduced. Various embodiments of vehicles including internal body cavity seals are described in detail below.

Figure 1:
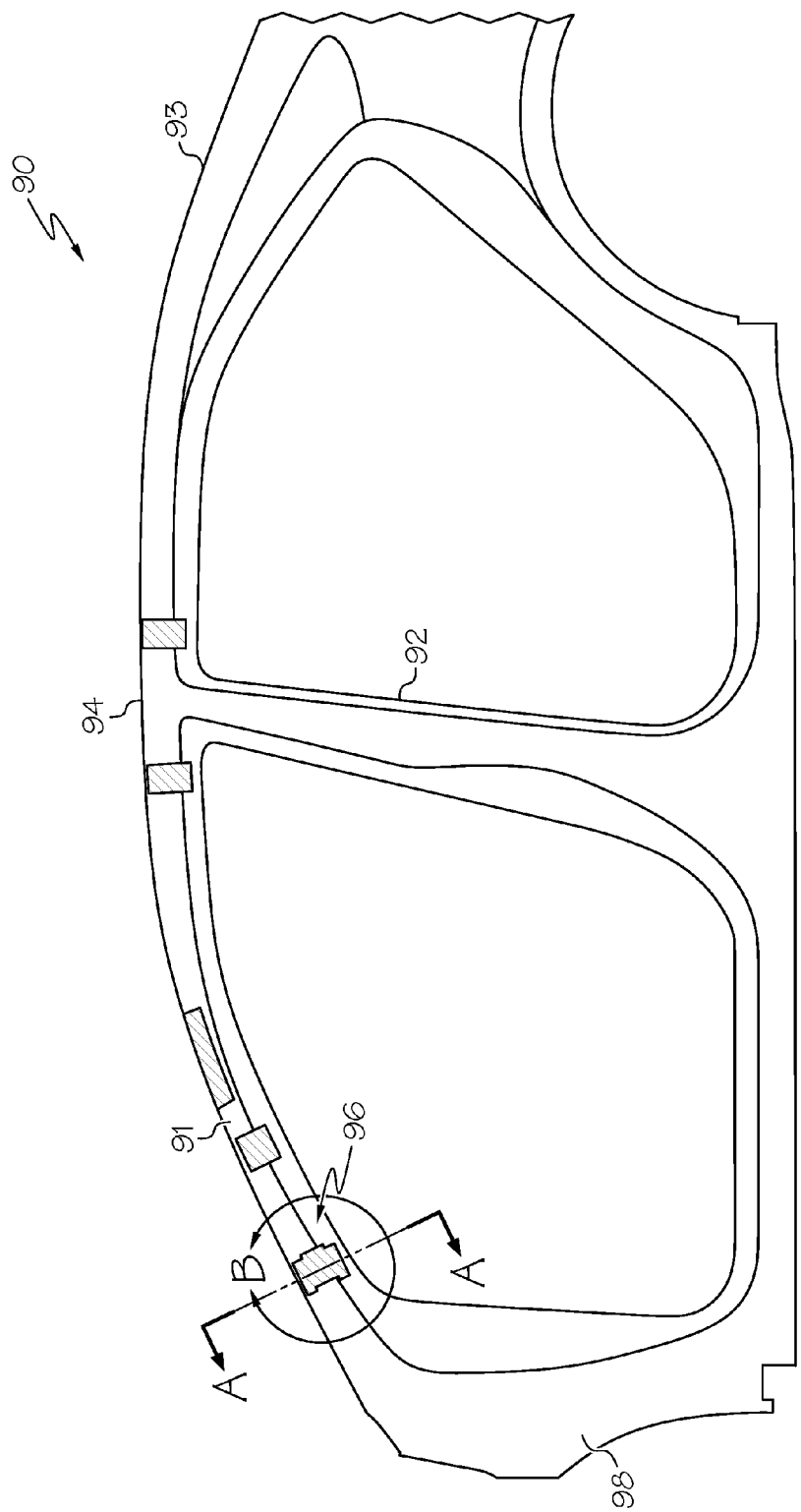
FIG. 1 schematically depicts a side view of a portion of a vehicle structure according to one or more embodiments shown or described herein.

Referring to FIG. 1, a portion of a vehicle 90 is depicted. As conventionally known, the vehicle 90 includes a plurality of vehicle structural members 96 that are coupled to one another to define the cabin of the vehicle 90. As depicted in FIG. 1, such vehicle structural members 96 of the vehicle 90 may include an A-pillar 91, a B-pillar 92, and a C-pillar 93. The A-pillar 91, the B-pillar 92, and the C-pillar 93 may be coupled to the roofline 94 of the vehicle 90. Such vehicle structural members 96 of the vehicle 90 may also include a side member 96 that extends forward from the A-pillar 91 of the vehicle 90.

The vehicle 90 may also include a plurality of exterior vehicle body panels 98 that are coupled to the vehicle structural members, and that define the exterior body shape of the vehicle 90. In the embodiment depicted in FIG. 1, the exterior vehicle body panel 98 is a front fender 98 that is coupled to a vehicle structural member 96, here the side member 96.

Figure 2:
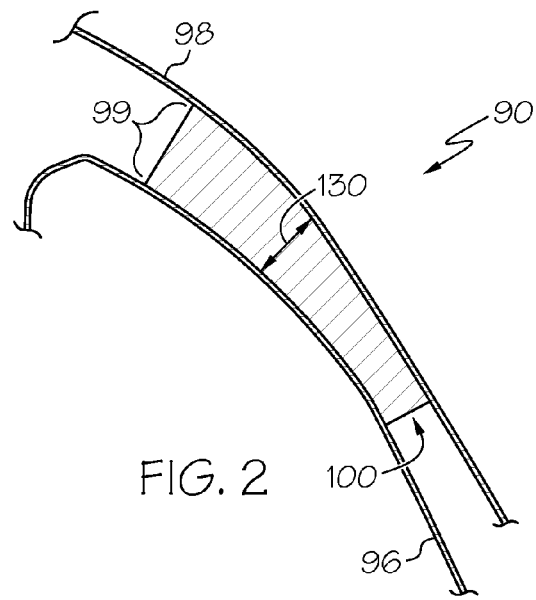
FIG. 2 schematically depicts a rearward sectional view depicting a portion of a vehicle structure along line A-A of FIG. 1.

Referring now to FIG. 2, the exterior vehicle body panel 98 may be positioned to generally overlap the vehicle structural member 96. The exterior vehicle body panel 98 may be spaced apart from the vehicle structural member 96 at positions spaced apart from locations (not shown) at which the exterior vehicle body panel 98 is secured to the vehicle structural member 96. The spacing between the exterior vehicle body panel 98 and the vehicle structural member 96 creates an internal body cavity 99. The internal body cavity 99 may extend for a length along the vehicle structural member 96. In some embodiments, the internal body cavity 99 may be generally open or hollow. The internal body cavity 99 may tend to transmit noise, for example, road noise, engine noise, and/or wind noise into the passenger cabin of the vehicle 90. Transmission of noise into the passenger cabin may be undesirable for vehicle occupants.

Referring collectively to FIGS. 1 and 2, the vehicle 90 may also include a compressible sealing member 100 that is positioned within the internal body cavity 99. The compressible sealing member 100 may fill the internal body cavity 99 such that the transmission of noise along the internal body cavity 99 is reduced. The compressible sealing member 100, therefore, may reduce the noise that is introduced to the passenger cabin of the vehicle 90.

The compressible sealing member 100 may be positioned relative to the vehicle structural member 96 and the exterior vehicle body panel 98 such that compressible sealing member 100 is positioned entirely within the internal body cavity 99 and is concealed from an exterior of the vehicle 90. The compressible sealing member 100 may be coupled to at least one of the vehicle structural member 96 or the exterior vehicle body panel 98. The compressible sealing member 100 may be compressed from its uninstalled thickness condition such that the compressible sealing member 100 contacts both the vehicle structural member 96 and the exterior vehicle body panel 98. The compressible sealing member 100 may accommodate local variations in the contour between the vehicle structural member 96 and the exterior vehicle body panel 98. The compressible sealing member 100 may reduce the transmission of noise along the internal body cavity 99.

Figure 3:
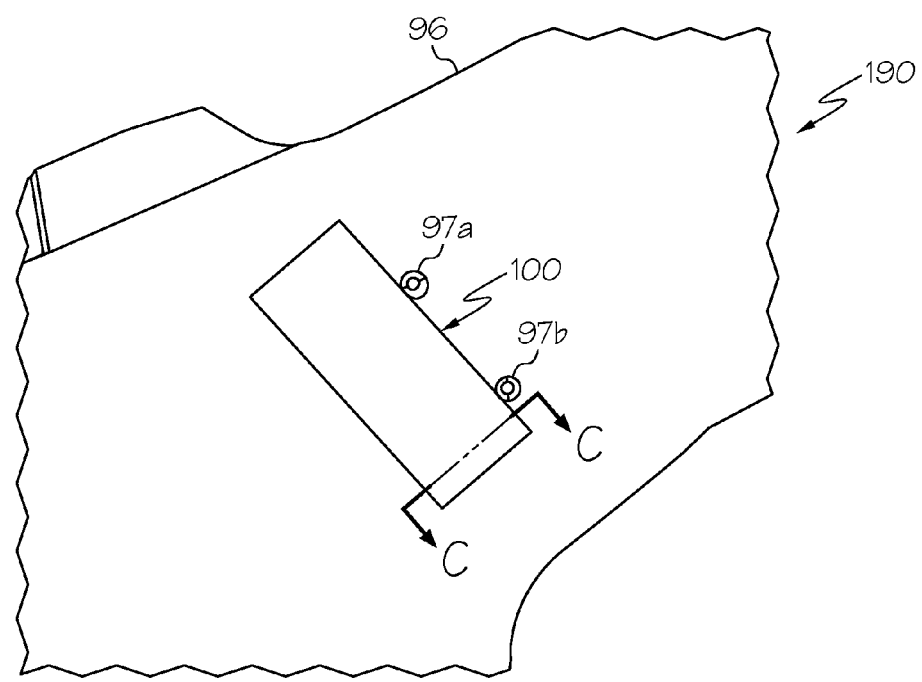
FIG. 3 schematically depicts a detailed side view of a portion of a vehicle structure along view B of FIG. 1.

Referring now to FIG. 3, a detailed view of one embodiment of the vehicle 90 is depicted. In this embodiment, the vehicle exterior vehicle body panel is removed for clarity. The vehicle 90 includes the vehicle structural member 96, to which the compressible sealing member 100 is coupled. The vehicle structural member 96 may include at least one datum feature 97a, 97b. In the embodiment depicted in FIG. 3, the datum features 97a, 97b include depressions that are formed into the vehicle structural member 96 prior to the vehicle structural member 96 being assembled into the vehicle. The datum features 97a, 97b may provide reference locations for an installer to position the compressible sealing member 100 for installation into the vehicle 90. Following installation of the compressible sealing member 100 onto the vehicle structural member 96, the exterior vehicle body panel (not shown) may be coupled to the vehicle structural member 96. Through assembly of the exterior vehicle body panel to the vehicle structural member 96, the compressible sealing member 100 may be compressed.

Figure 4:
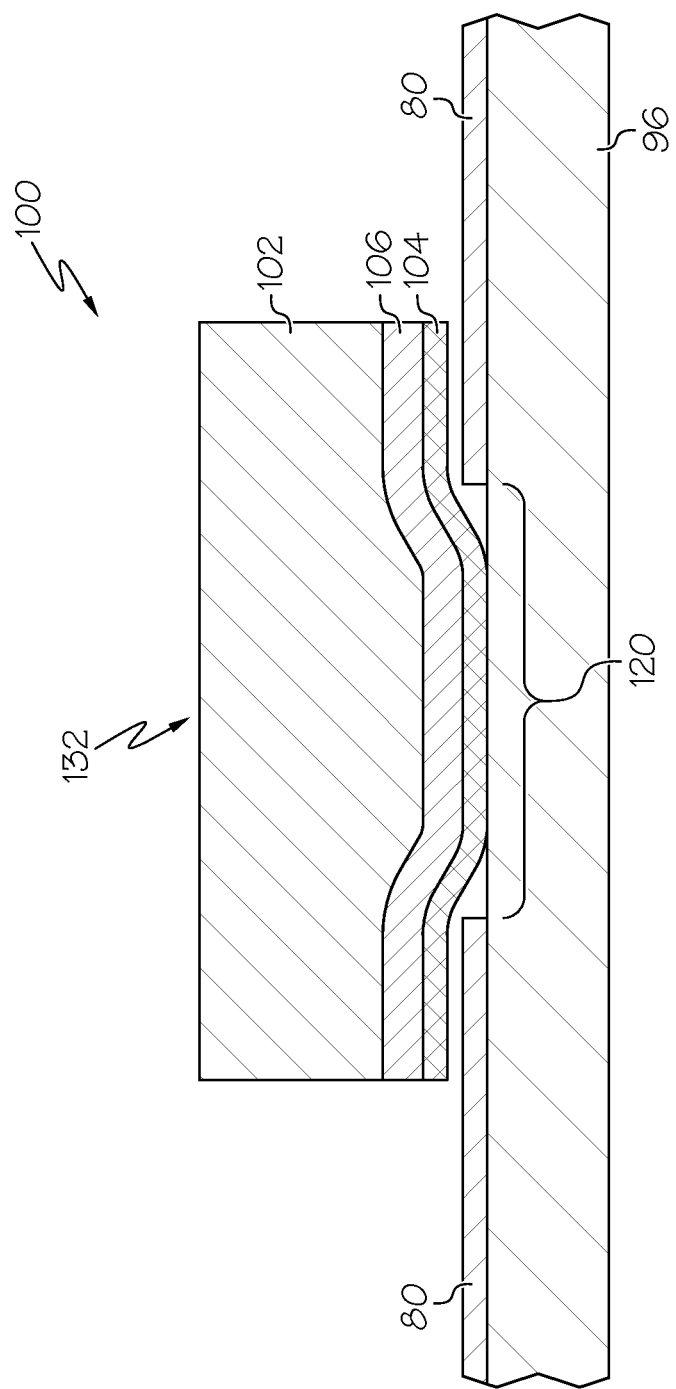
FIG. 4 schematically depicts a downward sectional view depicting a portion of a vehicle structure along line C-C of FIG. 3.

Referring now to FIG. 4, the compressible sealing member 100 is depicted as being installed on the vehicle structural member 96 and with the exterior vehicle body panel removed. The compressible sealing member 100 may be made from a variety of materials including, for example and without limitation, various natural or synthetic elastomers. In one embodiment, the compressible sealing member 100 may be made from ethylene-propylene terpolymer (EPT), which is available from NITTO DENKO of Novi, Mich. The compressible sealing member 100 may include an elastomeric foam 102, for example ethylene propylene diene monomer (EPDM). The compressible sealing member 100 may also include an adhesive backer 104. The adhesive backer 104 may be a pressure-sensitive adhesive. In some embodiments, the compressible sealing member 100 may also include an interior carrier 106 that is positioned between the elastomeric foam 102 and the adhesive backer 104. The interior carrier 106 may stabilize the compressible sealing member 100.

Still referring to FIG. 4, the compressible sealing member 100 may have an uninstalled thickness 132 that is evaluated from the adhesive backer 104 to the outside of the elastomeric foam 102. As discussed hereinabove, the compressible sealing member 100 may be compressed during assembly of the vehicle through attachment of the exterior vehicle body panel 98 to the vehicle structural member 96. Accordingly, as depicted in FIG. 2, the installed thickness 130 of the compressible sealing member 100 may be smaller than the uninstalled thickness 132 of the compressible sealing member 100, as depicted in FIG. 4.

Referring again to FIG. 4, the vehicle structural member 96 and the exterior vehicle body panel (not shown) may include a corrosion resistant coating 80 that is applied to the surfaces of the component. As conventionally known, the corrosion resistant coating may include an electrophoretic paint or a powder coating. In some embodiments, the corrosion resistant coating 80 may be removed from the vehicle structural member 96 and the exterior vehicle body panel, as will be discussed in greater detail below. The compressible sealing member 100 may be positioned to overlap a region 120 of at least one of the vehicle structural member 96 or the exterior vehicle body panel (not shown) that is free of a corrosion resistant coating 80. As depicted in FIG. 4, the vehicle structural member 96 may include regions having corrosion resistant coating 80 and a region 120 that is free of corrosion resistant coating 80. To minimize the likelihood of corrosion of the region 120 of the vehicle structural member 96 that is free of corrosion resistant coating 80, the compressible sealing member 100 may be positioned to overlap the region 120. The compressible sealing member 100 may therefore reduce ingress of contaminants to the region 120 that may otherwise accelerate corrosion of the vehicle structural member 96. In the embodiment depicted in FIG. 4, the compressible sealing member 100 also overlaps a portion of the vehicle structural member 96 that includes corrosion resistant coating 80.

Figure 5:
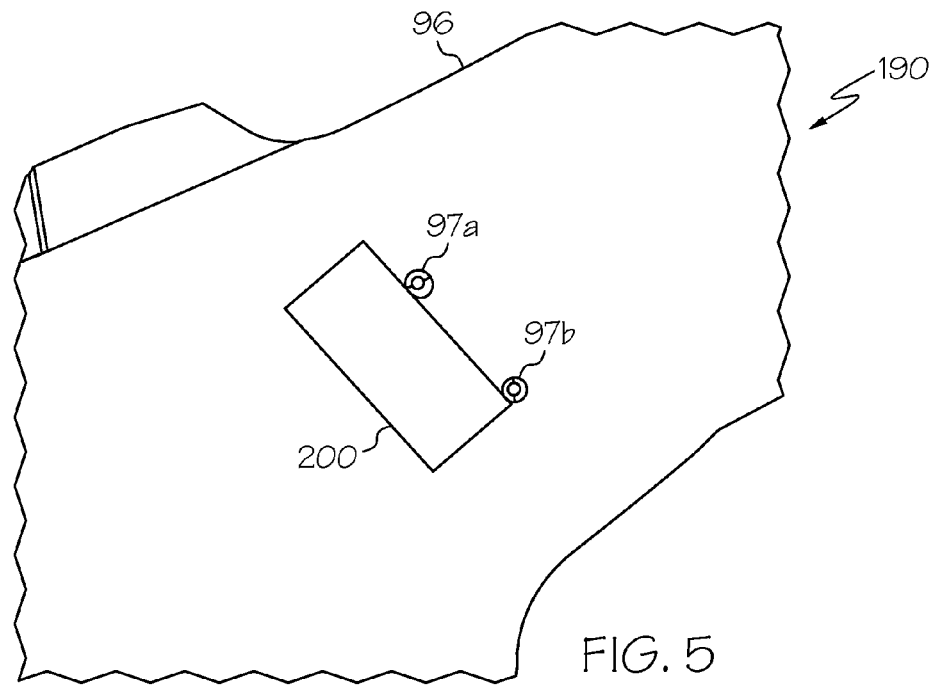
FIG. 5 schematically depicts a detailed side view of a portion of a vehicle structure according to one or more embodiments shown or described herein.

Referring to FIG. 5, another embodiment of a vehicle 190 is depicted. In this embodiment, the vehicle 190 includes an expandable foam 200 that is coupled to the vehicle structural member 96, as conventionally known and described in co-assigned U.S. application Ser. No. 13/588,498 to Nakayama. The expandable foam 200 is heat activated to expand and increase volumetrically in size when held at an elevated temperature. In conventional assembly techniques, the expandable foam 200 is applied to the vehicle structural member 96 prior to application of the corrosion resistant coating, such that adhesion of the expandable foam 200 to the vehicle structural member 96 is ensured. Following installation of the expandable foam 200, exterior vehicle body panel (not shown) is installed onto the vehicle structural member 96, and the corrosion resistant coating is applied to the vehicle structural member 96 and to the exterior vehicle body panel.

Subsequently to the application of the corrosion resistant coating, the vehicle is introduced to a bake oven in which the vehicle structural member 96 and the exterior vehicle body panel are held at a cure temperature to cure the corrosion resistant coating. Simultaneously, the expandable foam 200 is activated, and the expandable foam expands across the internal body cavity as to contact both the vehicle structural member 96 and the exterior vehicle body panel.

However, expandable foam 200 used in conventional applications may be rigid subsequent to expansion. Further, removal of the exterior vehicle body panel from the vehicle structural member 96, for example, during an assembly process to re-fit the exterior vehicle body panel or removal during a repair procedure following a vehicle collision, may compromise the integrity of the expandable foam 200. Therefore, following removal and installation of an exterior vehicle body panel, the expandable foam 200 may have a reduced effect on minimizing the transmission of noise along the internal body cavity.

Further, because the expandable foam 200 is activated and expands upon application of heat, it may be costly and time consuming to introduce a subsequent application of expandable foam 200 to the internal body cavity following removal and re-attachment of an exterior vehicle body panel. Instead, the expandable foam 200 may be completely or partially removed from the vehicle structural member 96 and the exterior vehicle body panel. Subsequent to removal of the expandable foam 200, a compressible sealing member according to the present disclosure may be installed onto the vehicle structural member 96 or the exterior vehicle body panel. Upon re-installation of the exterior vehicle body panel, the compressible sealing member may be deformed to contact both the vehicle structural member 96 and the exterior vehicle body panel, and may therefore reduce the transmission of noise along the interior body cavity.

Figure 6:
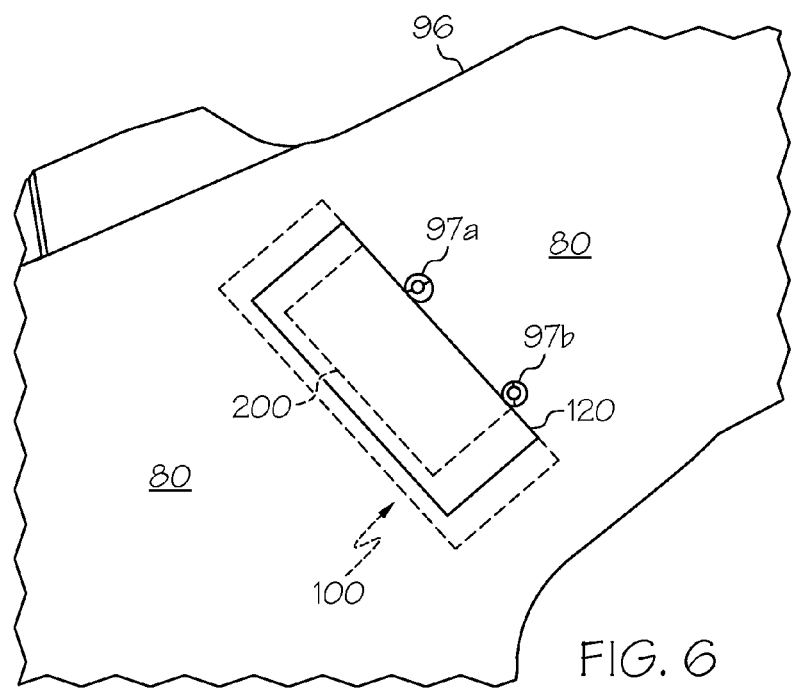
FIG. 6 schematically depicts a detailed side view of a portion of a vehicle structure according to one or more embodiments shown or described herein.

Referring now to FIG. 6, because the expandable foam 200 is attached to the vehicle structural member 96 prior to the introduction of the corrosion resistant coating, the region 120 of the vehicle structural member 96 to which the expandable foam 200 was attached may be free of corrosion resistant coating 80. Removal of the expandable foam 200, therefore, may expose the region 120 of the vehicle structural member 96 that is free of the corrosion resistant coating 80. As depicted in FIG. 6, because of the volumetric expansion of the expandable foam 200, the region 120 of the vehicle structural member 96 that is free of corrosion resistant coating 80 may be larger in area than the area of the expandable foam 200 as originally installed on the vehicle structural member 96.

Still referring to FIG. 6, the compressible sealing member 100 according to the present disclosure may be sized and positioned to cover the region 120 of the vehicle structural member 96 that is free of corrosion resistant coating 80. Further, in some embodiments, the compressible sealing member 100 may cover an area of the vehicle structural member 96 that is larger than the region 120 of the vehicle structural member 96 that is free of corrosion resistant coating 80, such that the compressible sealing member 100 covers the region 120 of the vehicle structural member 96 that is free of corrosion resistant coating 80 and regions of the vehicle structural member 96 that includes corrosion resistant coating 80.

The materials of the compressible sealing member 100 may be generally water-resistant, such that an introduction of water or other contaminants to the region 120 of the vehicle structural member 96 that is free of corrosion resistant coating 80 is minimized. By minimizing the introduction of water or other contaminants to the region 120 of the vehicle structural member 96 that is free of corrosion resistant coating 80, the compressible sealing member 100 may reduce the likelihood of the vehicle structural member 96 to corrode.

Further, because the compressible sealing member 100 does not require activation of expansion through heating, the materials of the compressible sealing member 100 may have lower-temperature operating thresholds. For example, the elastomeric foam 102 of the compressible sealing member 100 may have a maximum rated service temperature that is less than the cure temperature of the corrosion resistant coating 80. The compressible sealing member 100 according to the present disclosure, therefore, may be installed onto the vehicle and coupled to the underlying vehicle body panel without introducing the compressible sealing member 100 to a bake oven to activate the compressible sealing member 100. Instead, the compressible sealing member 100 reduces the transmission of noise along the internal body cavity without further activation.

It should now be understood that vehicles according to the present disclosure may include a compressible sealing member that is positioned in an internal body cavity between a vehicle structural member and an exterior body panel. The entirety of the compressible sealing member may be positioned within the internal body cavity such that the compressible sealing member is concealed from external view. The compressible sealing member may reduce the transmission of noise along the internal body cavity, such that the noise is not transferred into the passenger cabin of the vehicle. The compressible sealing member may be positioned to cover a region of at least one of the vehicle structural member or the exterior vehicle body panel that is free from corrosion resistant coating.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A vehicle comprising:
   a vehicle structural member,
   an exterior vehicle body panel coupled to the vehicle structural member and spaced apart from the vehicle structural member at an internal body cavity, wherein:
   at least one of the vehicle structural member or the exterior vehicle body panel comprises a region having a corrosion resistant coating and a region free of the corrosion resistant coating; and at least one of the vehicle structural member or the exterior vehicle body panel comprises a region that corresponds to an area of an expandable foam;

a compressible sealing member positioned in the internal body cavity such that the compressible sealing member is concealed from an exterior of the vehicle and coupled to at least one of the vehicle structural member or the exterior vehicle body panel and compressed from an uninstalled thickness to contact both the vehicle structural member and the exterior vehicle body panel, wherein the compressible sealing member covers the region of the at least one of the vehicle structural member or the exterior vehicle body panel that is free of the corrosion resistant coating and the compressible sealing member covers the region of the at least one of the vehicle structural member or the exterior vehicle body panel that corresponds to the area of the expandable foam.

2. The vehicle of claim 1, wherein the compressible sealing member further covers a portion of the region of the at least one of the vehicle structural member or the exterior vehicle body panel that includes the corrosion resistant coating.

3. The vehicle of claim 1, wherein the corrosion resistant coating comprises an electrophoretic paint.

4. The vehicle of claim 1, wherein the corrosion resistant coating comprises a powder coating.

5. The vehicle of claim 1, wherein the compressible sealing member comprises an elastomeric foam that is coupled to an adhesive backer.

6. The vehicle of claim 5, wherein a cure temperature of the corrosion resistant coating is greater than a maximum rated service temperature of the elastomeric foam.

7. The vehicle of claim 1, wherein the compressible sealing member is water resistant when compressed from the uninstalled thickness.

8. A vehicle comprising:

a vehicle structural member comprising at least one datum feature depressed into the vehicle structural member;

an exterior vehicle body panel coupled to the vehicle structural member and spaced apart from the vehicle structural member at an internal body cavity;

a compressible sealing member positioned in the internal body cavity and coupled to at least one of the vehicle structural member or the exterior vehicle body panel and compressed from an uninstalled thickness to contact both the vehicle structural member and the exterior vehicle body panel to reduce transmission of noise along the internal body cavity, wherein:

at least one of the vehicle structural member or the exterior vehicle body panel comprises a region having a corrosion resistant coating and a region free of the corrosion resistant coating;

the compressible sealing member covers the region of the at least one of the vehicle structural member or the exterior vehicle body panel that is free of the corrosion resistant coating; and the compressible sealing member contacts the at least one datum.

9. The vehicle of claim 8, wherein the compressible sealing member further covers a portion of the region of the at least one of the vehicle structural member or the exterior vehicle body panel that includes the corrosion resistant coating.

10. The vehicle of claim 8, wherein a cure temperature of the corrosion resistant coating is greater than a maximum rated service temperature of the compressible sealing member.

* * * * *